US012580833B1

(12) United States Patent
Chang et al.

(10) Patent No.: US 12,580,833 B1
(45) Date of Patent: Mar. 17, 2026

(54) SYSTEMS AND METHODS FOR WIRELESS NETWORK MANAGEMENT

(71) Applicant: PLUME DESIGN, INC., Palo Alto, CA (US)

(72) Inventors: Richard Chang, Los Altos Hills, CA (US); Miroslav Samardzija, Mountain View, CA (US); Xiaowei Qian, Suzhou (CN); MingShu Liu, Hsinchu City (TW); Shu-Hsuan Yang, Taoyuan City (TW); Shruti Royyuru, Mountain View, CA (US); Dinh Hieu Liem Vo, San Jose, CA (US); JianShing Li, Campbell, CA (US); Ha Do, Cumming, GA (US); Wei-Jen Lin, Hsinchu City (TW); Te-Wei Ho, Zhubei City (TW)

(73) Assignee: PLUME DESIGN, INC., Palo Alto, CA (US)

( * ) Notice: Subject to any disclaimer, the term of this patent is extended or adjusted under 35 U.S.C. 154(b) by 0 days.

(21) Appl. No.: 18/941,000

(22) Filed: Nov. 8, 2024

(51) Int. Cl.
  *G06F 15/177* (2006.01)
  *H04L 41/16* (2022.01)
  (Continued)

(52) U.S. Cl.
  CPC .............. *H04L 43/08* (2013.01); *H04L 41/16* (2013.01); *H04W 64/003* (2013.01)

(58) Field of Classification Search
  None
  See application file for complete search history.

(56) References Cited

U.S. PATENT DOCUMENTS 11,632,435 B1 * 4/2023 Jain ......................... H04L 41/16
                                                    709/224
2015/0365309 A1 * 12/2015 Kaminski ............... H04L 47/70
                                                    709/224
(Continued)

*Primary Examiner* — Phuoc H Nguyen
(74) *Attorney, Agent, or Firm* — Nicholas Martin; Greenberg Traurig, LLP

(57) ABSTRACT

Disclosed are computerized systems and methods for a decision intelligence (DI)-based framework that automatically and/or dynamically provides mechanisms for managing, optimizing and configuring a WiFi network at a location. The framework provides network management utilizing edge processing capabilities to bridge local WiFi and cloud systems. The framework implements comprehensive device typing through multi-layered analysis combining passive monitoring, deep packet inspection and hybrid deterministic-probabilistic classification methods. State synchronization between local and cloud networks can be achieved through hierarchical data modeling and differential synchronization algorithms. The framework can implement advanced features that include automated channel optimization, QoS management, and security monitoring. The framework incorporates self-healing capabilities using reinforcement learning techniques and maintains operational efficiency through intelligent resource management and workload distribution. The framework can operate autonomously while requiring minimal cloud connectivity, featuring extensible architecture through a plugin system that enables adaptation to evolving network requirements while maintaining stable operation of existing capabilities.

20 Claims, 8 Drawing Sheets

(51) Int. Cl.
    *H04L 43/08*       (2022.01)
    *H04W 64/00*     (2009.01)

(56)            References Cited

U.S. PATENT DOCUMENTS

| | | | | |
|---|---|---|---|---|
| 2021/0273961 A1* | 9/2021 | Humphrey | .......... | H04L 63/1425 |
| 2022/0311794 A1* | 9/2022 | Maya | .................. | G06F 11/0766 |
| 2022/0321596 A1* | 10/2022 | Weizman | ............ | H04L 61/4511 |
| 2023/0009127 A1* | 1/2023 | Boyer | ................... | G06F 21/563 |
| 2023/0275820 A1* | 8/2023 | Wang | .................... | H04L 41/064 |
| | | | | 709/224 |
| 2023/0412626 A1* | 12/2023 | Wright | .................... | H04L 41/16 |
| 2024/0141190 A1* | 5/2024 | Aoyama | ............. | C09D 153/00 |

* cited by examiner

300

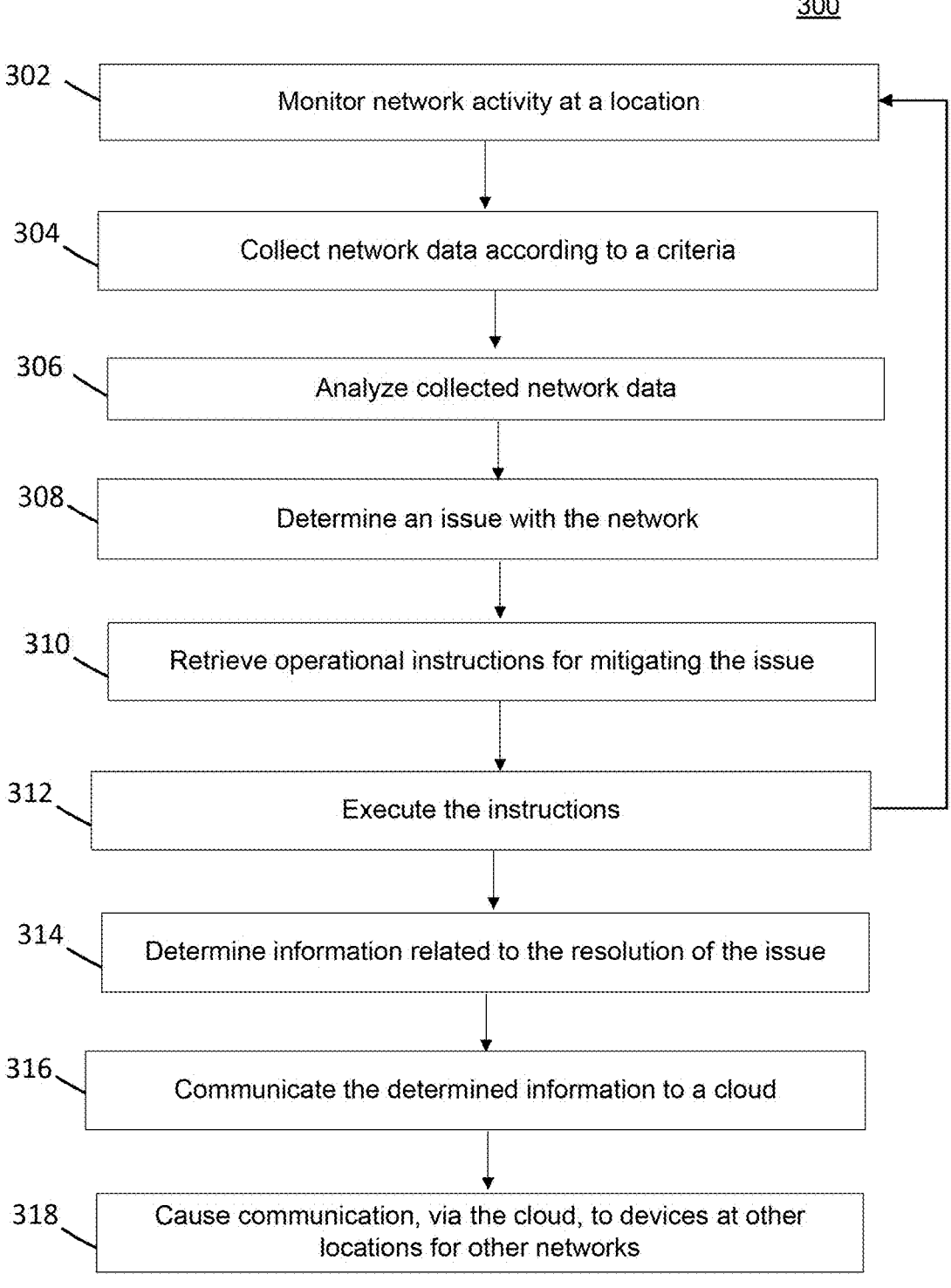

302  Monitor network activity at a location

304  Collect network data according to a criteria

306  Analyze collected network data

308  Determine an issue with the network

310  Retrieve operational instructions for mitigating the issue

312  Execute the instructions

314  Determine information related to the resolution of the issue

316  Communicate the determined information to a cloud

318  Cause communication, via the cloud, to devices at other locations for other networks

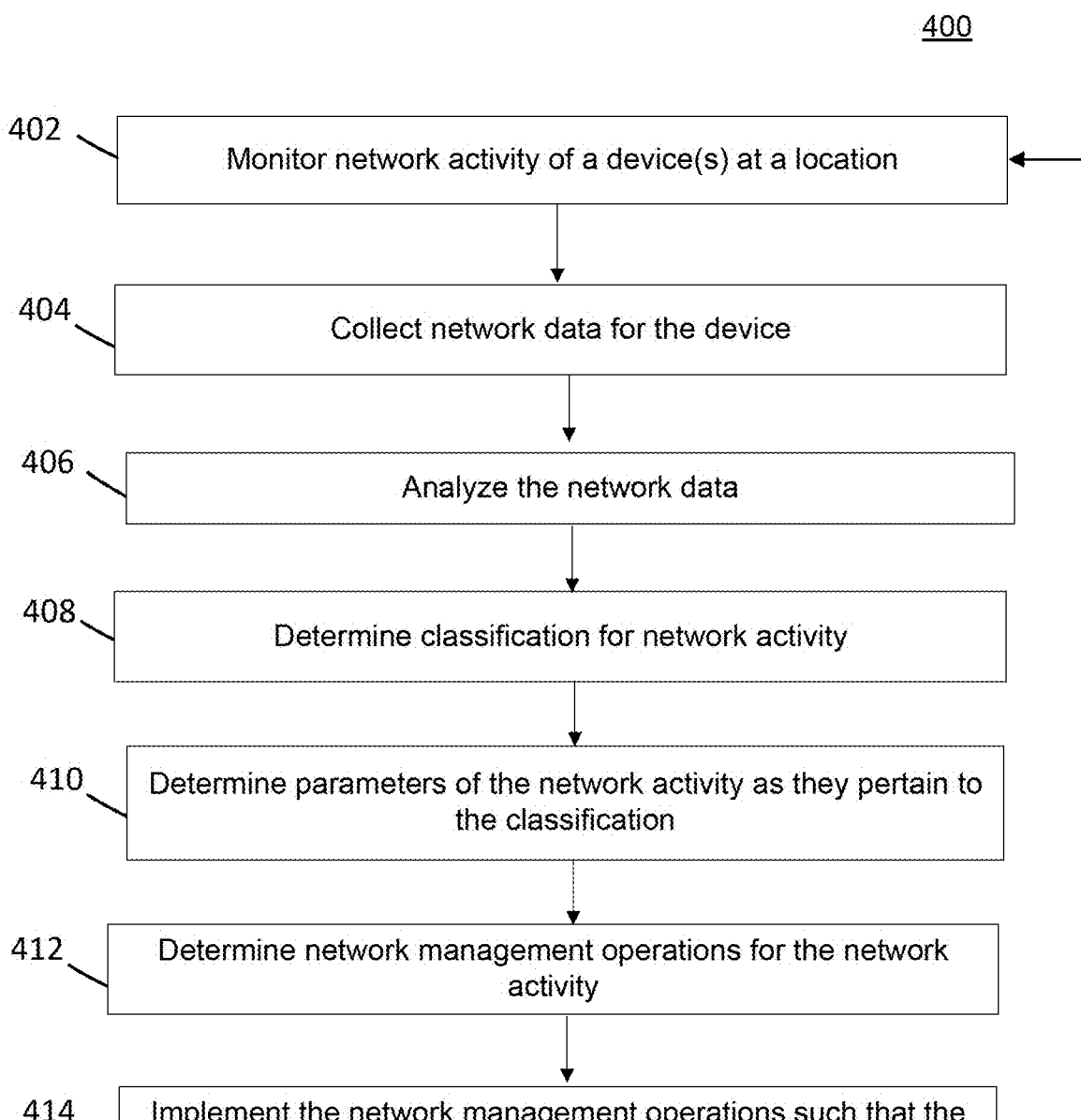

402 — Monitor network activity of a device(s) at a location

404 — Collect network data for the device

406 — Analyze the network data

408 — Determine classification for network activity

410 — Determine parameters of the network activity as they pertain to the classification 412 — Determine network management operations for the network activity 414 — Implement the network management operations such that the device is controlled respective to the network activity

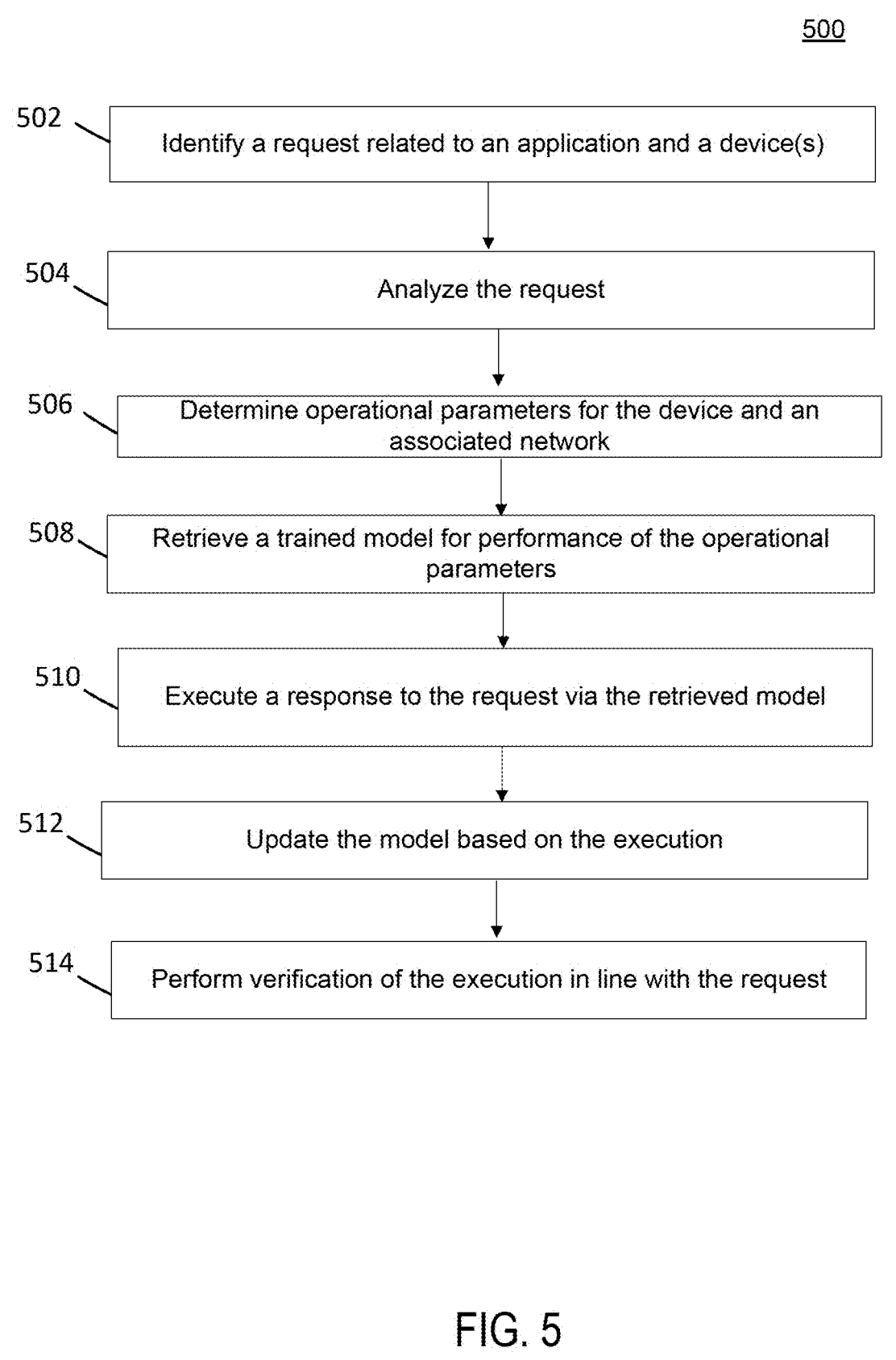

502 — Identify a request related to an application and a device(s)

504 — Analyze the request

506 — Determine operational parameters for the device and an associated network

508 — Retrieve a trained model for performance of the operational parameters

510 — Execute a response to the request via the retrieved model

512 — Update the model based on the execution

514 — Perform verification of the execution in line with the request

FIG. 5

SYSTEMS AND METHODS FOR WIRELESS NETWORK MANAGEMENT

FIELD OF THE DISCLOSURE

The present disclosure provides a decision intelligence (DI)-based computerized framework for automatically and/or dynamically managing, optimizing and configuring a Wireless Fidelity (Wi-Fi or WiFi, used interchangeably) network at a location.

SUMMARY OF THE DISCLOSURE

According to some embodiments, as discussed herein, the disclosed systems and methods provide a computerized, network management and configuration framework that operates by utilizing edge processing capabilities to bridge local WiFi and cloud systems. In some embodiments, the disclosed framework can provide WiFi and cloud integration via comprehensive device typing capabilities that go beyond traditional fingerprinting methods. In some embodiments, the framework employs a multi-layered approach to device identification, starting with passive monitoring of network traffic patterns, MAC address analysis, and protocol behavior signatures. By implementing deep packet inspection (DPI) at the local network level, the framework can analyze traffic characteristics such as packet sizes, timing intervals, and protocol-specific behaviors to create detailed device profiles. Such profiles can be continuously refined through artificial intelligence/machine learning (AI/ML) algorithms that operate at the edge (and/or in connection with network hosted and/or provided locations, in some embodiments), allowing for real-time adaptation to changing device behaviors and characteristics.

In some embodiments, the device typing operations of the disclosed framework can operate to leverage both deterministic and probabilistic methods to achieve high accuracy in device classification. In some embodiments, the deterministic component can rely on a local database of known device signatures, including manufacturer-specific OUI (Organizationally Unique Identifier) ranges, common service port usage patterns, and protocol implementation quirks. In some embodiments, the probabilistic component can employ, for example, Bayesian inference models that run locally on the network gateway or router, continuously updating device type confidence scores based on observed behaviors. Such dual approach allows for robust device identification even when dealing with new or modified device types that may not precisely match known signatures.

According to some embodiments, as discussed herein, the disclosed framework can operate and/or be configured to be implemented (e.g., on a device and/or on/over a network, for example) to perform the disclosed network management operations and/or provide local (WiFi) network capabilities as an independent configuration and/or architecture. That is, the disclosed framework can operate at a location independent of silicon vendor and/or platform (e.g., operating system (OS), mesh standards, and the like), such that such vendor-agnostic approach provides functionality for increased flexibility and prevents vendor lock-in, which is crucial for communication service providers (CSPs)—for example, as discussed herein, the disclosed framework can be operable in line with and/or by any device and/or service of a CSP, whether known or to be know, without departing from the scope of the instant disclosure.

Accordingly, by not being tied to a specific silicon vendor or platform, CSPs can customize the hardware and software to their preference. This means, for example, CSPs can choose the components that best suit their needs, whether it is related to, but not limited to, performance, cost, or specific features, and the like. Additionally, the disclosed framework as a unified platform can service a fleet of different devices, allowing CSPs to manage all of their customer premises equipment (CPE) together, which, among other technical benefits, can simplify device management and maintenance, thereby reducing the overall operational complexity and costs associated with maintaining a diverse range of CPE.

Furthermore, such vendor-agnostic approach future-proofs a device(s) and/or the framework operating thereon, as it can adapt to evolving standards and technologies without being constrained by the limitations of a specific platform. This, among other technical benefits, ensures that the framework can continue to provide valuable services and functionalities to CSPs and their customers, even as the industry landscape changes According to some embodiments, in order to enable effective synergy between local and cloud networks, the framework can implement a sophisticated state synchronization mechanism that maintains consistency while minimizing unnecessary data transfer. In some embodiments, the framework can employ a hierarchical data model where device profiles, network topology information and performance metrics are primarily stored and processed locally, with only aggregate data and critical updates being synchronized to the cloud. Such approach utilizes a differential synchronization algorithm that identifies and transmits only changed data elements, significantly reducing bandwidth requirements and ensuring efficient resource utilization. In some embodiments, the framework maintains a local cache of frequently accessed cloud resources, implementing intelligent prefetching mechanisms based on historical usage patterns and predicted network needs.

In some embodiments, the local-cloud synergy can be further enhanced through the implementation of edge computing capabilities that process and analyze network data at the source. In some embodiments, the framework can deploy containerized microservices at the edge that handle routine network management tasks, security analysis and performance optimization without requiring constant cloud connectivity. Such edge services can be orchestrated, for example, through a lightweight Kubernetes-based system that manages resource allocation and service lifecycle, ensuring optimal utilization of local computing resources while maintaining the ability to scale up to cloud resources when necessary.

According to some embodiments, network risk detection via the framework can be implemented through a multi-stage analysis pipeline that operates primarily at the edge. In some embodiments, the framework can continuously monitor various network health indicators, including, but not limited to, signal strength variations, interference patterns, bandwidth utilization, latency metrics, error rates across different network segments, and the like. Advanced anomaly detection algorithms, powered by local neural network models, can process such data in real-time to identify potential issues before they impact network performance. In some embodiments, the framework can employ both supervised and unsupervised learning techniques to establish normal behavior baselines for different network segments and device types, thereby allowing for context-aware risk detection that accounts for varying operational requirements and constraints.

In some embodiments, the automated resolution and mitigation components of the framework can operate through a sophisticated decision engine that evaluates detected issues against a comprehensive knowledge base of resolution strategies. As discussed herein, such engine (engine 200 of FIG. 2, discussed infra) can implement a combination of rule-based and AI/ML approaches to determine the most appropriate mitigation actions based on the specific context and historical success rates. The framework can maintain a local cache of successful resolution patterns, thereby allowing for rapid response to common issues without requiring cloud consultation. Thus, when novel problems are encountered, the framework can temporarily implement conservative mitigation strategies while analyzing the situation in more detail.

According to some embodiments, critical to the framework's effectiveness is its ability to perform automated channel optimization and frequency management at the local level. The framework, in some embodiments, can continuously monitor the radio frequency (RF) environment, which can include, but is not limited to, interference from neighboring networks and non-WiFi devices, using spectrum analysis capabilities built into modern WiFi hardware. Through real-time analysis of channel utilization, noise levels, client distribution, and the like, or some combination thereof, the framework can dynamically adjust channel assignments, transmission power levels, and multiple-input and multiple-output (MIMO) configurations to optimize network performance. Such adjustments can be made, for example, using a distributed optimization algorithm that considers the impact on all connected devices and maintains stability through gradual, controlled changes.

In some embodiments, the framework implements sophisticated Quality of Service (QOS) management capabilities that operate autonomously at the edge. By maintaining detailed profiles of application requirements and device capabilities, the framework can dynamically adjust bandwidth allocation, prioritization rules, band and client steering, traffic shaping policies, and the like, to ensure optimal performance for critical applications. Such QoS implementations can employ AI/ML models trained on historical usage patterns to predict resource requirements and preemptively adjust network configurations to accommodate anticipated demands.

According to some embodiments, security management provided via the framework can be implemented through a distributed security information and event management (SIEM) system, which in some embodiments, can operate primarily at the edge. The framework can employ real-time traffic analysis, behavior-based anomaly detection, signature-based threat detection, and the like, to identify and respond to security risks without requiring constant cloud connectivity. The framework can maintain a local threat intelligence database that is periodically updated from cloud sources but operates independently for routine security operations. Such approach allows for rapid response to security incidents while maintaining robust protection even during cloud connectivity interruptions.

In some embodiments, the framework can incorporate advanced self-healing capabilities through the implementation of automated recovery mechanisms. In some embodiments, when network issues are detected, the framework can automatically initiate various recovery procedures, including interface resets, service restarts, configuration rollbacks and the like, all managed through a sophisticated state machine that ensures safe and predictable behavior. The disclosed self-healing operations can be performed in accordance with a local history of recovery actions and their outcomes, for which such information can be compiled and utilized to refine its response strategies over time through reinforcement learning techniques.

In some embodiments, to support effective troubleshooting and maintenance, the framework can implement comprehensive logging and diagnostic capabilities at the edge. The framework can maintain detailed logs of network events, performance metrics, system actions, and the like, using intelligent log rotation and compression techniques to manage storage requirements. In some embodiments, advanced log analysis algorithms can process such data to identify patterns and correlations that might indicate developing issues or opportunities for optimization. In some embodiments, the framework can automatically generate diagnostic reports and recommendations based on this analysis, reducing the need for manual intervention in routine maintenance tasks.

In some embodiments, the framework's edge processing capabilities can be enhanced through the implementation of a distributed computing mesh that allows for the sharing of processing loads across multiple network devices. Such mesh architecture can enable more complex analysis and optimization tasks to be performed locally by distributing workloads across available computing resources. In some embodiments, the framework employs sophisticated workload balancing algorithms to ensure efficient resource utilization while maintaining responsive network management capabilities.

According to some embodiments, data management provided via the framework can be optimized through the implementation of intelligent caching and storage strategies. In some embodiments, the framework can employ multi-tiered storage with data classifications, automatically moving less frequently accessed data to slower storage tiers while maintaining rapid access to critical operational data. Such approach ensures efficient use of local storage resources while maintaining comprehensive historical data for analysis and troubleshooting purposes.

In some embodiments, the framework can implement robust failure recovery mechanisms through a combination of state replication and checkpoint management. For example, critical system state information is maintained in a distributed manner across multiple network devices, thereby allowing for rapid recovery in case of individual component failures. The framework can employ a consensus algorithm to maintain state consistency while enabling continued operation even when some components are unavailable.

According to some embodiments, integration with external systems can be facilitated through a comprehensive application program interface (API) layer that supports both local and cloud-based interactions. In some embodiments, the framework implements standard protocols for device management, configuration and monitoring, allowing for seamless integration with existing network management tools and systems. In some embodiments, the API layer includes robust authentication and authorization mechanisms to ensure secure access while maintaining efficient operation through local caching of frequently accessed resources.

In some embodiments, the framework's architecture is designed to be extensible and adaptable to new requirements and technologies. Through a plugin system based on a well-defined interface specification, new capabilities can be added without requiring modifications to the core framework. Such extensibility enables the framework to evolve with changing network requirements and incorporate new technologies as they become available, while maintaining stable and reliable operation of existing capabilities.

According to some embodiments, resource management via the framework can be implemented through a sophisticated capacity planning and allocation system. The framework can continuously monitor and track resource utilization across all components, using predictive analytics to anticipate resource requirements and adjust allocations accordingly. Such approach ensures optimal use of available resources while maintaining sufficient capacity for peak demands and unexpected events.

Moreover, performance optimization via the framework can be achieved through continuous monitoring and adjustment of network parameters. In some embodiments, the framework can employ AI/ML models trained on historical performance data to identify optimal configurations for different operating conditions. In some embodiments, as discussed herein, such AI/ML models can operate locally, thereby allowing for rapid adaptation to changing conditions without requiring cloud connectivity. In some embodiments, the framework maintains a local database of performance profiles that helps inform optimization decisions while minimizing the need for trial-and-error adjustments.

In some embodiments, the framework includes comprehensive reporting and visualization capabilities that operate primarily at the edge. Through local processing of network telemetry data, the framework can generate detailed insights into network performance, security status, operational efficiency, and the like. In some embodiments, such insights can be presented through a web-based interface or dashboard that can operate independently of cloud connectivity, providing network administrators with real-time visibility into network operations and automated management actions.

Accordingly, as discussed herein, the disclosed framework provides novel functionality and capabilities for a comprehensive approach to local network management that minimizes dependency on cloud resources while maintaining sophisticated capabilities for device typing, network optimization, and automated issue resolution. By emphasizing edge processing and local intelligence, the framework provides robust network management capabilities that can operate effectively even with limited or intermittent cloud connectivity, while still maintaining the ability to leverage cloud resources when available for enhanced functionality and global optimization.

Moreover, the disclosed framework can employ a hybrid architecture that balances local autonomy with cloud-enabled intelligence. By making individual nodes autonomous for most functions, the framework can reduce dependency on constant cloud connectivity and minimizes operational costs at scale. Each node can make independent decisions about interference management, load balancing, basic troubleshooting, and the like. However, in some embodiments, the framework can leverage cloud connectivity strategically to enable AI/ML capabilities, allowing nodes to learn from collective experiences across the entire network. This approach, as discussed herein, provide functionality for computerized solutions discovered in one part of the network to be analyzed in the cloud and propagated to other nodes, creating a continuously improving system while maintaining cost-effective autonomous operations at the local level.

According to some embodiments, it should be understood that reference to a location can refer to any type of known or to be known geographic area, building, structure or area for which wireless connectivity can be provided, which can include, but is not limited to, a home, office, building, patio, and the like, without departing from the scope of the instant disclosure.

According to some embodiments, a method is disclosed for automatically and/or dynamically managing, optimizing and configuring a WiFi network at a location. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for automatically and/or dynamically managing, optimizing and configuring a WiFi network at a location.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 3 illustrates an exemplary workflow according to some embodiments of the present disclosure;

FIG. 4 illustrates an exemplary workflow according to some embodiments of the present disclosure;

FIG. 5 illustrates an exemplary workflow according to some embodiments of the present disclosure;

DETAILED DESCRIPTION

Figure 1:
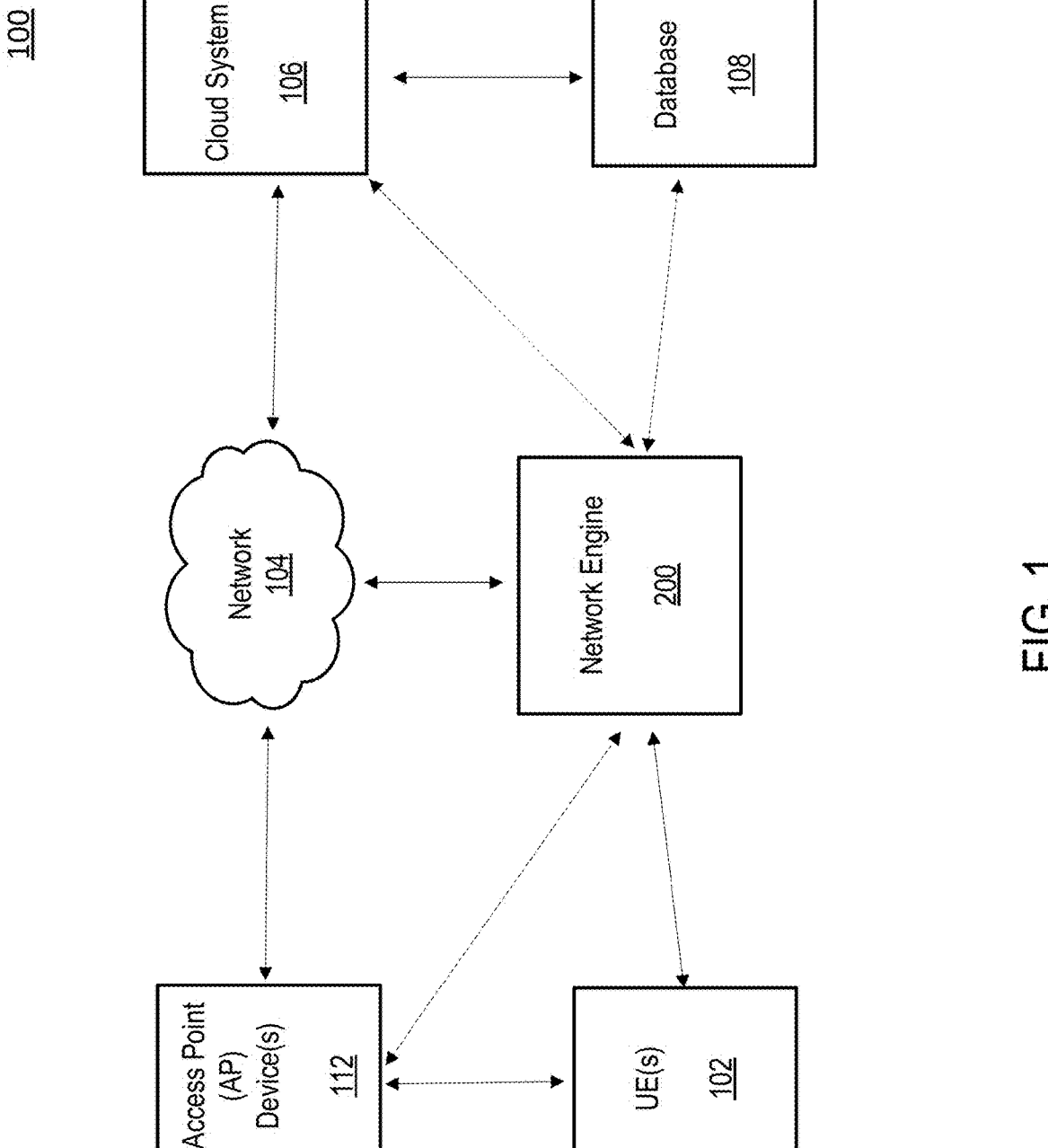
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/a/g/n/ac/ax/be, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. According to some embodiments, as discussed herein, disclosed are systems and methods for an advanced network management framework that utilizes edge processing capabilities to bridge local WiFi and cloud systems. The framework implements comprehensive device typing through multi-layered analysis combining passive monitoring, deep packet inspection, and hybrid deterministic-probabilistic classification methods. State synchronization between local and cloud networks can be achieved through hierarchical data modeling and differential synchronization algorithms. As discussed herein, the framework deploys containerized microservices at the edge for network management, employing neural network-based risk detection and automated mitigation strategies. Advanced features include automated channel optimization, QoS management, and security monitoring through a distributed SIEM system operating primarily at the edge. The framework incorporates self-healing capabilities using reinforcement learning techniques and maintains operational efficiency through intelligent resource management and workload distribution. The framework operates autonomously while requiring minimal cloud connectivity, featuring extensible architecture through a plugin system that enables adaptation to evolving network requirements while maintaining stable operation of existing capabilities.

With reference to FIG. 1, system 100 is depicted which includes user equipment (UE) 102 (e.g., a client device, as mentioned above and discussed below in relation to FIG. 8), access point (AP) device 112, network 104, cloud system 106, database 108 and network engine 200. It should be understood that while system 100 is depicted as including such components, it should not be construed as limiting, as one of ordinary skill in the art would readily understand that varying numbers of UEs, AP devices, peripheral devices, sensors, cloud systems, databases and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, sensor, Internet of Things (IoT) device, wearable device, autonomous machine, smart television, set top box (STB), media streaming device, game console, and any other device equipped with a cellular or wireless or wired transceiver. For example, UE 102 can be a smart phone of a user.

In some embodiments, peripheral devices (not shown) can be connected to UE 102, and can be any type of peripheral device, such as, but not limited to, a wearable device (e.g., smart ring, smart watch, for example), printer, speaker, sensor, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

In some embodiments, UE 102 can include and/or correspond to, but not be limited to, any type of device, component and/or sensor associated with a location of system 100 (referred to, collectively, as "sensors"). In some embodiments, the UE 102 can be any type of device that is capable of sensing and capturing data/metadata related to activity of the location. In some embodiments, the sensors can be associated with devices associated with the location of system 100, such as, for example, STBs, access point devices, televisions, personal assistants (e.g., Alexa®, Nest®, for example)), smart phones, smart watches or other wearables, tablets, personal computers, and the like, and some combination thereof. In some embodiments, UE 102 can be associated with any device connected and/or operating on cloud system 106 (e.g., a cloud-based device, such as a server that collects information related to the location, for example).

According to some embodiments, AP device 112 is a device that creates and/or provides a wireless local area network (WLAN) for the location. According to some embodiments, the AP device 112 can be, but is not limited to, a router, switch, hub, gateway, extender and/or any other type of network hardware that can project a WiFi signal to a designated area. In some embodiments, UE 102 may be an AP device.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a service provider, content provider, internet service provider ISP), communication service provider (CSP), and the like, which has associated network resources hosted on the internet or private network (e.g., network 104), which enables (via engine 200) the content management and delivery discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102, AP device 112, and the services and applications provided by cloud system 106 and/or network engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 6:
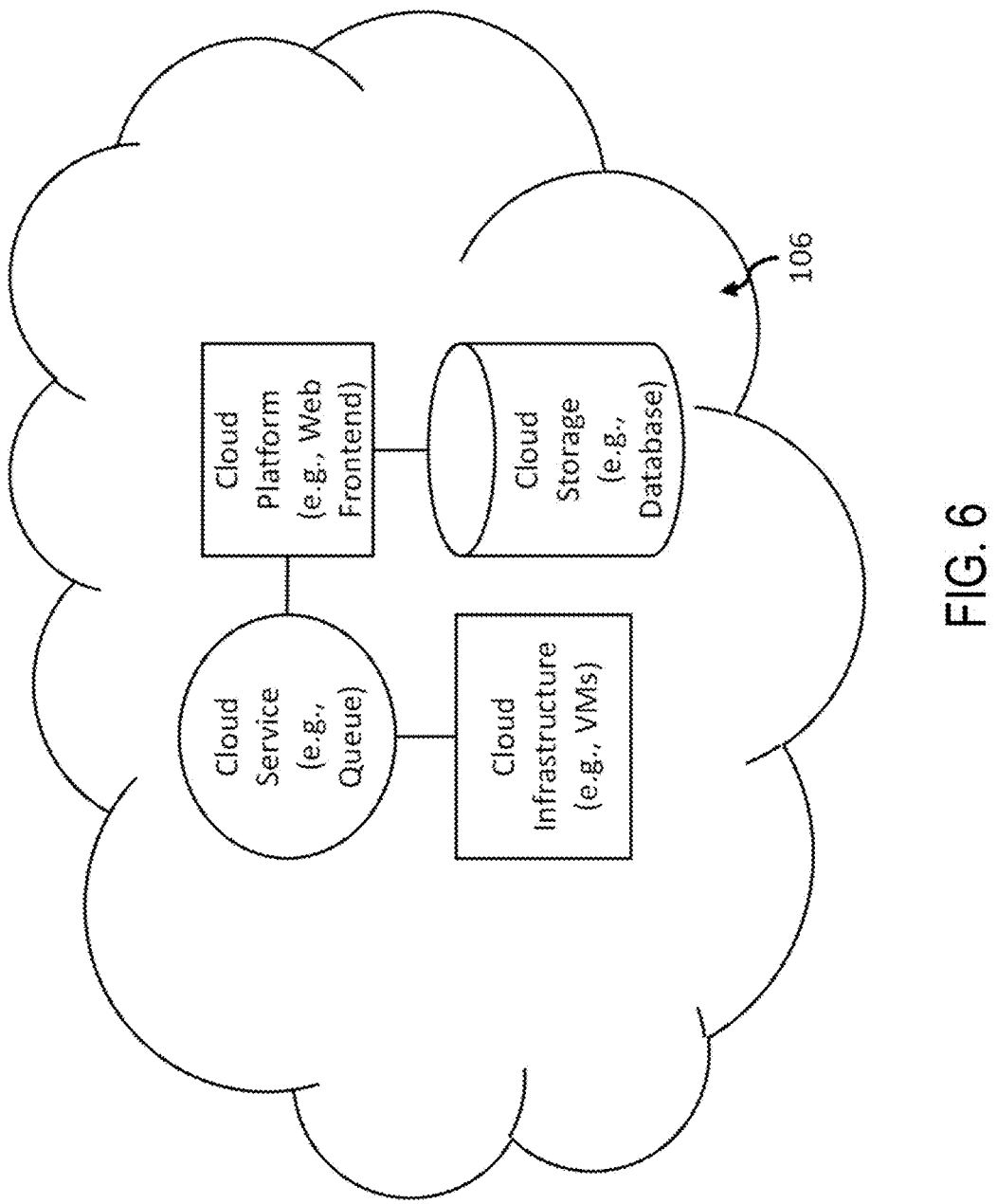
FIG. 6 depicts an exemplary implementation of an architecture according to some embodiments of the present disclosure.
Figure 7:
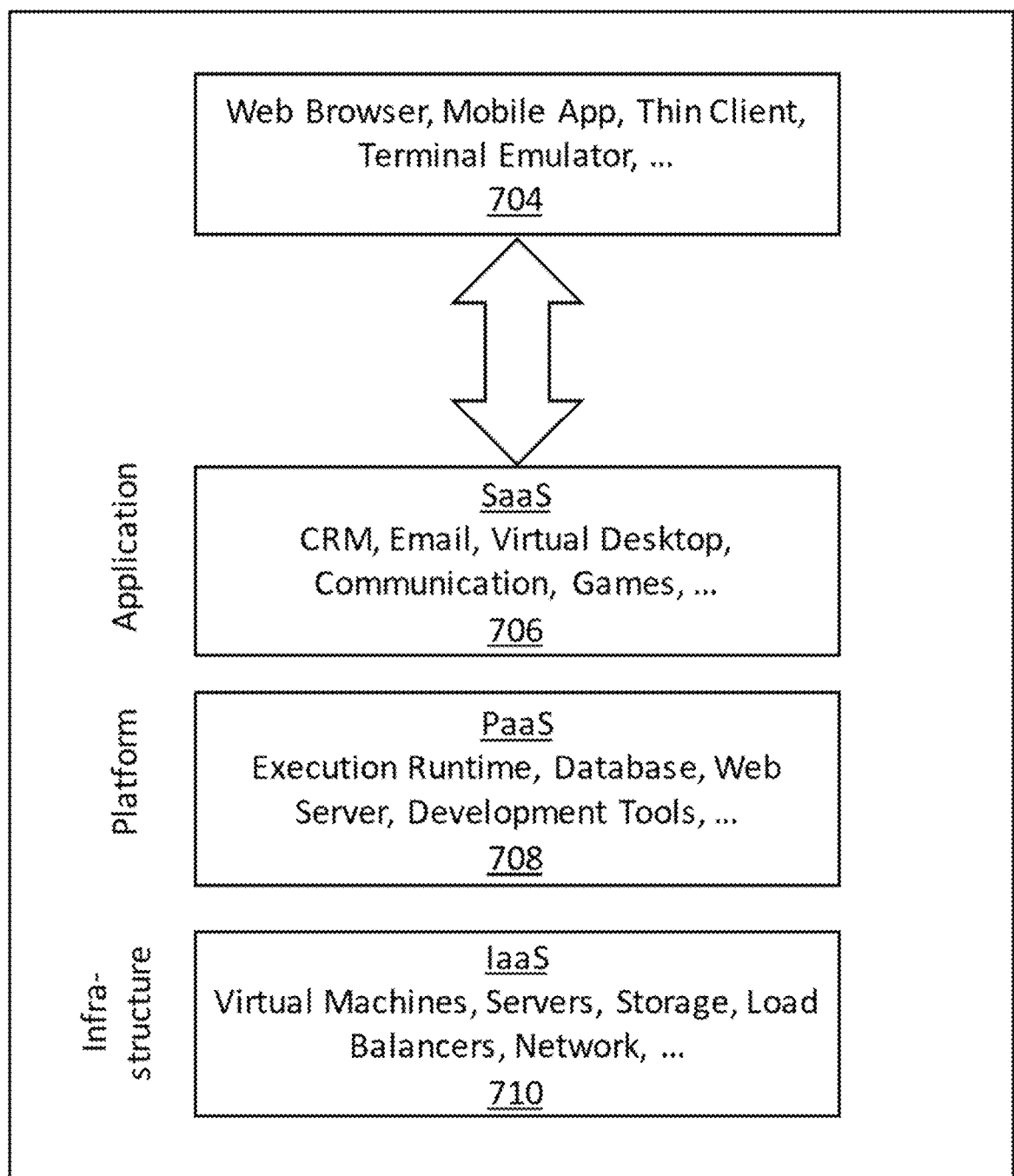
FIG. 7 depicts an exemplary implementation of an architecture according to some embodiments of the present disclosure.

Turning to FIGS. 6 and 7, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 710, platform as a service (PaaS) 708, and/or software as a service (Saas) 706 using a web browser, mobile app, thin client, terminal emulator or other endpoint 704. FIGS. 6 and 7 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, structured query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Network engine 200, as discussed above and further below in more detail, can include components for the disclosed functionality. According to some embodiments, network engine 200 may be a special purpose machine or processor, and can be hosted by a device on network 104, within cloud system 106, on AP device 112 and/or on UE 102. In some embodiments, engine 200 may be hosted by a server and/or set of servers associated with cloud system 106.

By way of non-limiting example, engine 200 can function within UE 102, which as discussed above and in more detail below, can be a STB and/or smart television, for example. In another non-limiting example embodiment, engine 200 can function via a smart phone of a user, as an application for which the user can interact with a STB and/or smart television.

According to some embodiments, as discussed in more detail below, network engine 200 may be configured to implement and/or control a plurality of services and/or microservices, where each of the plurality of services/microservices are configured to execute a plurality of workflows associated with performing the disclosed network management. Non-limiting embodiments of such workflows are discussed and provided below.

According to some embodiments, as discussed above, network engine 200 may function as an application provided by a content and/or service provider and/or cloud system 106. In some embodiments, engine 200 may function as an application installed on a server(s), network location and/or other type of network resource associated with system 106. In some embodiments, engine 200 may function as an application installed and/or executing on AP device 112 and/or UE 102. In some embodiments, such application may be a web-based application accessed by AP device 112 and/or UE 102, and/or devices accessible over network 104 from cloud system 106. In some embodiments, engine 200 may be configured and/or installed as an augmenting script, program or application (e.g., a plug-in or extension) to another application or program provided by cloud system 106 and/or executing on AP device 112 and/or UE 102. Accordingly, as provided below, engine 200 can execute on a device, at a network location, on nodes of a network and/or across a network, on differing components to perform the operations of each module executing therein.

Figure 2:
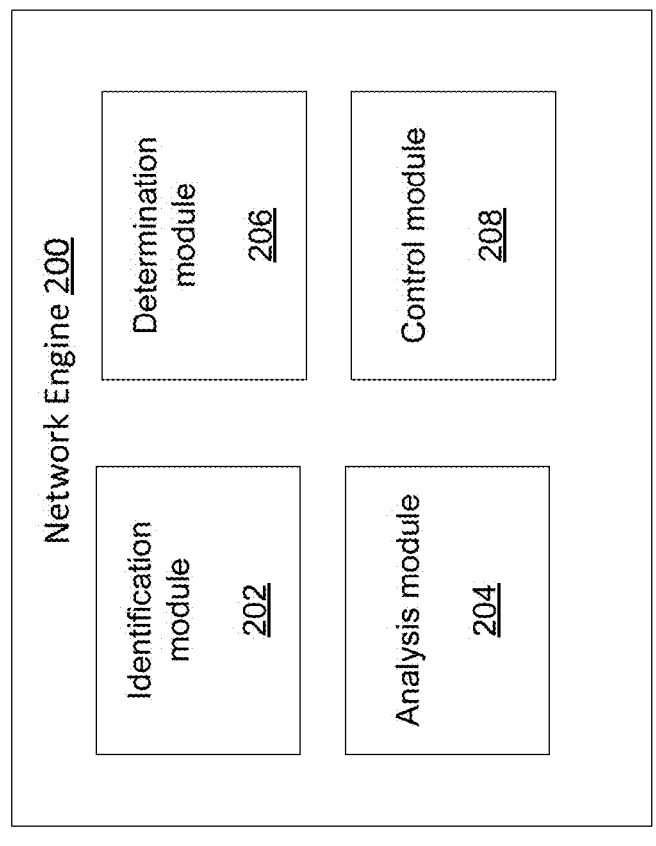
FIG. 2 is a block diagram illustrating components of an exemplary system according to some embodiments of the present disclosure.

As illustrated in FIG. 2, according to some embodiments, network engine 200 includes identification module 202, analysis module 204, determination module 206 and control module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Turning to FIG. 3, Process 300 provides non-limiting example embodiments for the disclosed network management. As discussed herein, the disclosed systems and methods provide computerized mechanisms for network issue detection, remediation and solution sharing. As discussed herein, FIG. 3 provides example embodiments for the disclosed framework to continuously monitor network performance metrics across connected devices and infrastructure components at a location, which encompasses both device-specific measurements and broader network characteristics including signal quality, interference levels, throughput, latency, error rates, and the like, or some combination thereof. As discussed below, the disclosed framework (via engine 200) can process such telemetry data in real-time to establish baseline performance patterns and detect anomalous behavior that may indicate developing issues.

According to some embodiments, as discussed herein, when monitoring network operations, the disclosed framework (e.g., via engine 200) maintains detailed historical performance data for each device and network segment. Such historical context allows the engine 200 to differentiate between normal performance variations and genuine issues requiring intervention. As provided below, AI/ML algorithms can be utilized to process multiple metric streams simultaneously to identify subtle patterns and correlations that may indicate emerging problems before they cause significant service disruption.

By way of a non-limiting example embodiment, according to some embodiments, in the specific case of wireless interference detection, the framework can implement specialized monitoring of RF characteristics across all active channels and frequency bands. The framework can track metrics including signal-to-noise ratios, error rates, retransmission frequencies, channel utilization levels, and the like. Such data can be analyzed both in real-time and over historical periods to identify interference patterns and their impact on network performance. The framework can differentiate between various types of interference including co-channel interference, adjacent channel interference, and external noise sources.

According to some embodiments, when the framework detects a potential interference issue affecting a specific device or network segment, it initiates a detailed analysis process to characterize the problem. Such analysis examines the temporal and spatial characteristics of the interference, its impact on various performance metrics, and any correlations with other network events or environmental factors. The framework maintains a knowledge base of interference patterns and their typical causes to aid in rapid problem diagnosis.

Once the interference issue is properly characterized, the framework evaluates potential remediation options based on current network conditions and available resources. For wireless channel-related issues, the engine considers factors including current channel utilization across the network, client device capabilities, coverage requirements and potential impact on other network segments. The framework's decision-making algorithms weigh multiple factors to identify the optimal solution while minimizing potential negative effects.

According to some embodiments, the framework (e.g., engine 200) can operate as a local controller on a UE and/or AP (as discussed above in relation to FIG. 1) to select and execute a remediation action, such as moving affected devices to a different channel or frequency band. In some embodiments, the controller can manage such transition process carefully to minimize service disruption, which can include, but is not limited to, coordinating with affected devices to ensure they can support the new channel assignment, managing the transition timing to minimize impact on active sessions, verifying successful migration completion, and the like.

Accordingly, in some embodiments, after implementing the local solution, the framework can continue monitoring affected devices and network segments to verify the effectiveness of the remediation action. The framework can collect detailed metrics before, during and/or after the channel transition to document the impact on network performance. Such information can be essential both for verifying problem resolution and for building the knowledge base of successful solutions.

In some embodiments, once the effectiveness (e.g., accuracy, for example) of the local solution is confirmed/verified, the framework can prepare a detailed solution package for upload to a cloud platform. For example, such package can include, but is not limited to, comprehensive information about the original problem detection, characterization data, selected solution, implementation process, measured results, and the like, or some combination thereof. In some embodiments, such information can be formatted according to standardized schemas that facilitate sharing and analysis across the broader network of controllers.

Accordingly, in some embodiments, the cloud upload process implemented by the disclosed framework can ensure secure and reliable transmission of solution data to the central platform. The framework can implement robust error handling and retry mechanisms to handle potential connectivity issues during upload. In some embodiments, the solution package can be digitally signed to ensure authenticity and includes version information to support proper sequencing of updates across the controller network.

When solution data reaches the cloud platform, it can be subject to additional analysis and validation before being made available to other controllers. In some embodiments, the cloud platform can aggregate solution data from multiple sources to identify common patterns and refine solution effectiveness metrics. AI/ML algorithms can process such aggregated data to improve problem detection and solution selection across the entire controller network.

Thus, in some embodiments, other connected controllers can then access this expanded knowledge base through their local instances of the framework (e.g., engine 200). In some embodiments, the framework can implement intelligent caching of solution data to ensure rapid access to relevant information even during cloud connectivity interruptions. In some embodiments, controllers can periodically synchronize their local caches with the cloud platform to maintain up-to-date solution information.

In some embodiments, when similar issues are detected by other controllers, the disclosed framework can leverage the shared solution knowledge to implement faster and more effective remediation. For example, the framework can compare current problem characteristics with previously documented cases to identify the most relevant solutions. This can significantly reduce the time required for problem resolution while improving the likelihood of successful remediation.

According to some embodiments, the disclosed framework can implement a feedback mechanism to report the effectiveness of shared solutions when applied to new situations. Such feedback helps refine solution ratings and applicability criteria across the controller network. The framework's AI/ML capabilities can therefore continuously improve its ability to match solutions to specific problem characteristics based on this accumulated experience.

As provided herein, the distributed nature of the disclosed computerized solution provides important benefits for overall network operation. Individual controllers can operate autonomously using their local knowledge base when cloud connectivity is limited. The cloud platform provides a robust mechanism for sharing proven solutions across the entire controller network. This combination supports both rapid local problem resolution and continuous improvement of solution effectiveness.

In some embodiments, the framework's implementation on network devices and/or at a location supports the extension to handle new types of network issues and solutions as they emerge. New monitoring capabilities, analysis algorithms and remediation actions can be added through software updates. Such extensibility ensures that the solution sharing framework can evolve to address changing network requirements. Moreover, performance optimization is another important aspect of the framework's operation. The framework can implement efficient data structures and algorithms to minimize resource usage while maintaining rapid response capabilities. For example, caching and prefetching mechanisms help ensure that relevant solution data is readily available when needed.

Thus, as provided herein with reference to at least Process 300 of FIG. 3, the disclosed operations evidence the power of combining local intelligence with cloud-based knowledge sharing. Individual controllers can rapidly address local issues while contributing to the continuous improvement of solution effectiveness across the entire network. Such collaborative approach provides significant benefits for overall network operation and management efficiency.

According to some embodiments, Steps 302 and 304 of Process 300 can be performed by identification module 202 of network engine 200; Step 306 can be performed by analysis module 204; Steps 308 and 314 can be performed by determination module 206; and Steps 310, 312, 316 and 318 can be performed by control module 208.

According to some embodiments, Process 300 begins with Step 302 where engine 200 can monitor network activity at a location. As discussed above, such activity can be related to a UE or set of UEs, an AP or set of APs for a wireless network (e.g., WiFi network) at a location (e.g., a home). Such monitoring can be performed in real-time, continuously, and/or according to a criteria (e.g., a time, date, type of activity, type of user, an identifier (ID), type of device, type of application, amount of data, network performance, and the like, or some combination thereof).

In Step 304, based on the monitoring in Step 302, engine 200 can collect network data according to a criteria (or according to an event). For example, as discussed above, traffic metrics for the network can indicate a certain or threshold satisfying level of interference on a particular channel; therefore, as in Step 304, engine 200 can collect such network data related to such event, which can include data related to, but not be limited to, a time, date, location, user, ID, device, application, content, traffic type, channel/band, and the like.

In Step 306, engine 200 can analyze such collected network data. As discussed above, such analysis can involve engine 200 implementing any type of known or to be known computational analysis technique, algorithm, mechanism or technology. In some embodiments, engine 200 may include a specific trained AI/ML model, a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may leverage an LLM(s), whether known or to be known. As discussed herein, an LLM is a type of AI system designed to understand and generate human-like text based on the input it receives. The LLM can implement technology that involves deep learning, training data and natural language processing (NLP). Large language models are built using deep learning techniques, specifically using a type of neural network called a transformer. These networks have many layers and millions or even billions of parameters. LLMs can be trained on vast amounts of text data from the internet, books, articles, and other sources to learn grammar, facts, and reasoning abilities. The training data helps them understand context and language patterns. LLMs can use NLP techniques to process and understand text. This includes tasks like tokenization, part-of-speech tagging, and named entity recognition.

LLMs can include functionality related to, but not limited to, text generation, language translation, text summarization, question answering, conversational AI, text classification, language understanding, content generation, and the like. Accordingly, LLMs can generate, comprehend, analyze and output human-like outputs (e.g., text, speech, audio, video, and the like) based on a given input, prompt or context. Accordingly, LLMs, which can be characterized as transformer-based LLMs, involve deep learning architectures that utilizes self-attention mechanisms and massive-scale pre-training on input data to achieve NLP understanding and generation. Such current and to-be-developed models can aid AI systems in handling human language and human interactions therefrom.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the user data, as discussed herein.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
    b. transfer the input data to the neural network model,
    c. train the model incrementally,
    d. determine the accuracy for a specific number of timesteps,
    e. apply the trained model to process the newly-received input data,
    f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

In Step 308, based on the analysis from Step 306, engine 200 can determine information related to the issue with the network. For example, in Step 304 above, network data can indicate that the network may be disrupted and/or may not be operating an optimal or at least minimum thresholds; and in Step 308, based on the analysis of such network data in Step 306, engine 200 can determine the issue, its cause, the participating devices, users and/or applications (or other components). For example, network download values for a device on a 5 GHz channel may be below a threshold, and in Step 308, engine 200 can determine that such channel is currently subject to particular interference (which can be a pattern of activity—for example, such interference occurs daily).

In Step 310, engine 200 can retrieve or determine operational instructions for mitigating the issue. The issue can have information related to, but not limited to, a cause, location on the network, device causing the issue, application causing the issue, user causing the issue, network metrics or characteristics impacted, and the like. Such instructions can be directly tied to or based on the related issue from Step 308. For example, if the issue is interference on a specific channel, then the operational instructions for mitigating the issue can involve switching to another channel available on the network. As discussed herein, such operational instructions can be logged and/or stored locally so that improved remediation and/or mitigation to the issue can be performed without having to access a remote network location (e.g., cloud) for the operational instructions.

In some embodiments, engine 200 can determine the operational parameters based on an AI/ML and/or LLM-based analysis of the information associated with the issue, such that the local device can perform on-the-spot analysis and determination of how to remedy/mitigate and/or fix the issue. Such AI/ML and/or LLM techniques are similar to those discussed above.

In some embodiments, as provided below, such operational instructions can be tied to a synergy between network data related to a content delivery network for which a UE on the network is receiving data, as it is tied to the local network activity of the WiFi network at the location.

In Step 312, engine 200 can cause the execution of the operational instructions. Such execution can involve the modification of the network and/or connections and/or components (e.g., channels, transmitter (Tx), receiver (Rx), and the like) providing, facilitating and/or supporting network connectivity for devices. Accordingly, the operation of Step 312 provides the self-healing of the self-diagnosed issue (from Step 308, discussed supra).

According to some embodiments, such execution in Step 312 can also cause scheduling of such operations, so that should the issue be detected again and/or be predicted to occur (e.g., detection of the criteria, as in Step 304 supra), such operational instructions can be re-performed to prevent the network issue from occurring again. For example, if interference occurs on the specific channel at least n times in a week at k time during the day, and the operational instructions are performed each time to mitigate such interference, engine 200 can cause the AP at the location to switch channels prior to k time for the UE connected thereto so that the interference is prevented.

In Step 314, engine 200 can determine information related to the resolution of the issue. As discussed above, information related to the resolution by the local controller can be provided to a cloud, so that other controllers for other networks can be provided such solutions. Accordingly, the determined information can include, but is not limited to, the criteria (from Step 304), device ID, user ID, application ID, issue, issue type, issue ID, resolution type, operational instructions (from Step 310), and the like, or some combination thereof. In some embodiments, Step 314 can involve analyzing and filtering such information such that only, for example, the operational parameters and issue information are sent to the cloud.

In some embodiments, as discussed above, such determined information can be logged/stored locally, and as provided above, can be provided to the cloud for storage and communication to other networks and/or network devices.

Accordingly, in Step 316, engine 200 can cause the communication of such determined information to the cloud, whereby, upon storage in the cloud, such determined information can be sent to other devices on other networks, as in Step 318. Such communication can be based on, but not limited to, network types, service provider ID (e.g., which internet service provider (ISP) is providing the network at the other location), AP type and/or number of APs, number of UEs on such networks, location type, and the like, or some combination thereof. For example, if another location is a customer of a same ISP, then engine 200 can cause the cloud to communicate the determined information to that other location because it may be subject to such issues in the future, and this can equip such local controller operating at such network to handle such issue at the local level and in an efficient, accurate manner. Accordingly, in some embodiments, such communication can enable preventative measures to be performed, as discussed herein. That is, for example, such operational parameters can be executed (or put in place) to ensure that any similar or related issues can be avoided from occurring, rather than being reactive, for example.

According to some embodiments, the network data processed, leveraged and utilized to control a network at a local level, as discussed in Process 300 supra, can be utilized to synchronize with and/or optimize network data at a cloud level, and vice versa. For example, how local data is processed respective to how content is delivered to the local devices over the Internet, can be reciprocally leveraged to improve the local network's operations as well as the content delivery network's operations.

For example, in some embodiments, nodes of a network can be synchronized and/or subject to coordination, which can ensure that underlying issues, whether specific to a specific node, a network type, device type, and the like, or some combination thereof, can be addressed, either prospectively, reactively, or some combination thereof.

Accordingly, the disclosed framework provides coordination mechanisms that can rely on contextual awareness between nodes on and/or across a network (e.g., nodes of neighbors, for example) to maintain optimal performance and diagnose issues accurately. For example, When nodes communicate with their neighbors, they can share critical information about signal strength, channel utilization, interference patterns, and the like. Such peer-to-peer (P2P) awareness allows nodes to dynamically adjust their settings to minimize interference—for example, by coordinating channel selection or adjusting transmission power levels.

In some embodiments, the disclosed framework can be utilized in troubleshooting scenarios. For example, when multiple neighboring nodes experience issues simultaneously, the shared context can be leveraged by engine 200 to distinguish between localized problems (e.g., a single unplugged router) and broader network issues affecting an entire area. For example, if several adjacent nodes go offline at the same time, the framework can correlate this information with other contextual data like power status, backhaul connectivity, and/or environmental factors, and the like, to determine the root cause.

Such contextual intelligence also enables proactive network optimization. Nodes can coordinate maintenance windows, balance client loads, create redundancy paths, and the like based on their understanding of neighboring nodes' status and capabilities. By maintaining such rich contextual awareness, the framework can enable or provide functionality for a network to self-optimize and provide more reliable service while simplifying troubleshooting and maintenance for network operators.

Thus, according to some embodiments, the integration of network performance metrics with content delivery data can create powerful opportunities for optimization across both domains. At the network level, detailed telemetry data including bandwidth utilization, latency patterns, packet loss rates and quality of service measurements provides insight into the network's ability to deliver different types of content effectively. Simultaneously, content-related data such as type, size, priority, and delivery requirements helps inform network resource allocation and optimization decisions.

Such bidirectional data flow enables sophisticated content-aware networking capabilities. By understanding the characteristics and requirements of different content types, network systems can implement intelligent prioritization and resource allocation schemes. For example, real-time streaming content can be given priority over bulk downloads, while still ensuring adequate service levels for all traffic types. Such content awareness extends to quality of service mechanisms, buffer management, and routing decisions.

From the content delivery perspective, awareness of network conditions and capabilities enables dynamic adaptation of content parameters. Content delivery systems can adjust streaming bit rates, compression levels and caching strategies based on current network performance metrics. Such adaptive behavior helps maintain optimal user experience while efficiently utilizing available network resources. Moreover, a content delivery system can also predict potential network congestion and proactively adjust delivery parameters to prevent service degradation.

Accordingly, such synergy between network and content data enables sophisticated predictive capabilities. Historical analysis of both network performance and content delivery patterns can help identify correlations and trends that can be used to optimize future operations. For example, AI/ML algorithms that process such combined data can predict peak usage periods, potential congestion events and changing delivery requirements with increasing accuracy over time.

Moreover, in some embodiments, caching strategies can benefit from this two-way data flow. Network performance metrics help identify optimal cache locations and sizes, while content popularity and usage patterns inform cache population and replacement policies. The combined data enables predictive caching where content is proactively positioned based on both network conditions and expected demand patterns.

Further, quality of experience (QoE) metrics can provide another important dimension for this synergy. For example, by correlating network performance data with content delivery statistics and user experience measurements, the framework can identify optimal operating parameters for different scenarios. This, among other benefits, can help maintain consistent service quality while maximizing resource utilization efficiency.

Additionally, the technical benefits of this synergistic approach are substantial. Network resource utilization improves through better matching of capacity with content delivery requirements. Dynamic adaptation of both network parameters and content delivery characteristics helps prevent congestion while maintaining service quality. Predictive capabilities enabled by the combined data help prevent service disruptions through proactive resource allocation and content positioning.

In some embodiments, load balancing capabilities can also be enhanced through this integrated approach. Understanding both network conditions and content requirements enables more intelligent distribution of traffic across available resources. The framework can better predict capacity requirements and adjust load distribution patterns to prevent localized congestion while maintaining efficient resource utilization.

Furthermore, security operations, fault tolerance and recovery and performance optimization can be improved as well. For example, network-level security metrics can be correlated with content delivery patterns to identify potential threats or anomalous behavior. Content-based security policies can be enforced more effectively with awareness of network conditions and capabilities.

In another example, when network issues are detected, content delivery systems can quickly adapt to maintain service levels. Similarly, content delivery problems can trigger network-level adjustments to help mitigate the impact. The combined data enables faster problem detection and more effective remediation strategies. And, in yet another example, performance optimization becomes more effective with access to both network and content metrics. The framework can better balance competing demands for resources while maintaining service quality objectives.

Accordingly, such synergistic relationship between network and content data represents a powerful approach to optimizing overall system performance. The technical benefits span multiple operational areas including resource utilization, service quality, security and cost efficiency. The framework provides a strong foundation for continuing evolution of both network capabilities and content delivery services.

Turning to FIG. 4, disclosed is Process 400, which discloses mechanisms for leveraging advanced device-typing and profiling mechanisms for purposes of controlling network activity of a device. For example, parental controls can be determined, curated and timely implemented based on a device user, device type and/or application usage, as discussed herein.

According to some embodiments, device typing functionality and capabilities can provide powerful capabilities for understanding and managing device behavior across different network environments. By collecting and analyzing detailed information about device characteristics, usage patterns and network interactions, such operations can be utilized to build and understand behavioral profiles that inform network management decisions.

Accordingly, in some embodiments, such processing is based on a detailed device identification and classification. As discussed herein, the framework can collect multiple data points about each connected device including hardware specifications, operating system details, supported network protocols, application profiles, and the like. Such basic typing information is enhanced with dynamic performance metrics including processor utilization, memory usage, network traffic patterns, power consumption characteristics and the like. The combination of static and dynamic data provides a rich foundation for understanding device behavior.

According to some embodiments, learning device habits involves sophisticated pattern analysis across multiple dimensions. The framework can track temporal usage patterns to understand when different devices are typically active and what resources they require during different time periods. This includes, but is not limited to, analysis of daily, weekly and seasonal variations in device activity. The framework can also examine spatial patterns to understand how device behavior changes based on location within the network coverage area.

In some embodiments, application usage patterns can form another crucial component of device habit analysis. The framework can monitor which applications are actively used on different devices, their resource requirements and their impact on network performance. Such information helps identify typical workload patterns for different device types and usage scenarios. The framework can differentiate between interactive applications requiring low latency and background processes that can tolerate more network variation.

In some embodiments, network interaction patterns can provide insights into device behavior. In some embodiments, the framework analyzes metrics including data transfer volumes, protocol usage, connection frequency, and quality of service requirements. This helps identify typical network resource needs for different devices and usage scenarios. In some embodiments, the framework also tracks how these requirements change based on factors like time of day, location, and concurrent network activity.

In some embodiments, the power usage patterns can provide additional context for device behavior analysis. In some embodiments, the framework monitors how different devices manage power consumption, including use of sleep modes, wake patterns, and correlation between power states and network activity. This information helps optimize network resource allocation while respecting device power management requirements.

Accordingly, in some embodiments, as the framework builds understanding of device habits, the framework can develop behavioral profiles for different device types and usage scenarios. Such profiles, for example, can incorporate multiple factors including, but not limited to, temporal patterns, spatial characteristics, application requirements, network interactions, power management behavior, and the like.

As discussed herein, according to some embodiments, the application of learned device habits to network management begins with basic access control decisions. For example, when a device attempts, for example, to connect to a new network, reconnect to an existing network, access a network resource, and the like, the framework can apply relevant behavioral profiles to inform initial access policies. This can include factors such as, but not limited to, permitted bandwidth allocation, quality of service (QOS) priorities, traffic shaping parameters, and the like. In some embodiments, the framework can implement graduated access policies that evolve as device behavior is verified against expected patterns.

In some embodiments, the framework can proactively adjust network resources based on predicted device requirements derived from behavioral profiles. This includes, for example, dynamic adjustment of channel assignments, power levels, QoS parameters, and the like. In some embodiments, the framework can optimize resource allocation across multiple devices while maintaining appropriate service levels for different usage scenarios.

In some embodiments, application management policies can be tailored based on learned device habits. In some embodiments, the framework can implement application-specific controls including traffic prioritization, bandwidth allocation, and latency requirements. Such policies can adapt dynamically based on current network conditions while maintaining consistency with established device behavior patterns.

In some embodiments, security policies become more effective through application of device habit information. In some embodiments, the framework can quickly identify anomalous behavior that deviates from established patterns, potentially indicating security issues. This includes unusual connection patterns, unexpected application usage and/or abnormal network traffic characteristics. In some embodiments, the framework can implement automated responses to potential security issues while maintaining appropriate service levels for legitimate usage.

In some embodiments, power management optimization can be performed based on device habit information. In some embodiments, the framework can adjust network parameters to support efficient device power management while maintaining required service levels. This includes, for example, coordinating sleep state transitions, optimizing wake patterns, managing background traffic to minimize unnecessary device activation, and the like.

In some embodiments, the framework can implement version control mechanisms for behavioral profiles to manage evolution over time. For example, as device habits change, the framework can update relevant profiles while maintaining historical context. This allows the framework to identify both short-term variations and longer-term trends in device behavior. Version control also helps prevent potential conflicts between different profile variants.

As discussed herein, the disclosed functionality for device and network control provides numerous benefits for network operation and management. For example, the combination of sophisticated pattern analysis and automated policy implementation enables optimal network performance while reducing management overhead.

According to some embodiments, Steps 402 and 404 of Process 400 can be performed by identification module 202 of network engine 200; Step 406 can be performed by analysis module 204; Steps 408-412 can be performed by determination module 206; and Step 414 can be performed by control module 208.

In some embodiments, Process 400 begins with Step 402 where engine 200 can monitor network activity for a device (or devices) at a location. Based on such monitoring, network data can be collected, which relates to the device(s), as in Step 404. The operations of Step 402 and 404 can be performed in a similar manner as discussed above in relation to Steps 302 and 304 of Process 300 of FIG. 3.

For example, engine 200 can monitor network activity of a device, which can relate to the device connecting to a WiFi network or initiating execution of an application, and collect network data for the device based therefrom. In some embodiments, the network In some embodiments, as discussed above, upon collection of the network data, engine 200 can retrieve profile data associated with the device (or user of the device), as discussed above. As above, such profile data can indicate, but is not limited to, usage, application, power and/or resource habits of the device (or of the user of the device).

In Step 406, engine 200 can analyze the collected network data. In some embodiments, as discussed above, the analysis in Step 406 can be based on the retrieved profile data. In some embodiments, such analysis can be performed via any of the known or to be known AI/ML and/or LLM techniques discussed above.

In Step 408, based on the analysis in Step 406, engine 200 can determine a classification for the network activity (of the device and/or user). Such classification can indicate, but is not limited to, a type of network activity, ID associated with such network activity, account related to such network activity, network metrics related to such network activity, device ID of the device, ID of the user, time, date, location, content, channel/band, and the like, or some combination thereof.

Accordingly, in Step 408, engine 200 can classify the network activity to determine whether it is permitted as requested, whether it can be permitted in a modified manner, for a time period, whether it is to be denied, and the like, or some combination thereof. For example, the classification can indicate that the requesting user is either an adult, under the age of 12, an elderly person over the age of 65, a resident, a guest, and the like, or some combination thereof.

In Step 410, based on the classification, engine 200 can determine parameters of the network activity. Such parameters can correspond to, but are not limited to, application usage, pattern of activity, locations, time of day, content, and the like. For example, if the user is under the age of 12, certain types of content may be throttled or prevented for the user. In another example, if the user is an adult and is requesting a specific application type (e.g., a work application, for example), then regardless of time or other users/devices on the networks, the adult user will be given preference on the network (e.g., allot a certain amount of bandwidth to enable no buffering, interference or latency, or put that device on a specific channel without other users on that channel, and the like, for example).

Accordingly, in some embodiments, the parameters in Step 410 can correspond to controls, permissions and/or thresholds for which the network activity can be managed, manipulated, modified or otherwise controlled.

In Step 412, based on the determined parameters in Step 410, engine 200 can determine network management operations of the network activity. That is, engine 200 can determine executable and/or implementable operations, constraints and/or configurations that can be implemented at the device level, at the network level and/or location-level (e.g., at AP, for example) to enable enactment of the determined parameters. For example, if an application is to be blocked, then engine 200 can perform operations to prevent the device from accessing the network resource from which the application is linked, for example. In another example, certain permissions can be applied to the device that can cause access to the application to be restricted for a time period.

And, in Step 414, engine 200 can cause implementation (or execution) of the network management operations such that the device is controlled respective to the network activity. That is, the network activity is controlled in a manner via the network management operations.

Turning to FIG. 5, disclosed is Process 500 which details non-limiting example embodiments for configuring, both at the testing phase and/or during implementation, network devices in order to optimize their performance. As discussed herein, the implementation of AI/ML models for network device management requires a sophisticated approach that addresses both the controlled environment of testing phases and the dynamic challenges of real-world operations.

According to some embodiments, the foundation of such a framework begins with a comprehensive training framework that incorporates both historical network data and simulated scenarios to develop robust models capable of handling diverse network conditions and configurations.

In some embodiments, in the testing phase, the framework can employ a multi-stage validation approach for debugging network devices. In some embodiments, the first stage involves static analysis of device configurations using NLP models, for example, trained on vendor documentation, best practices, known configuration patterns, and the like. Such LLM models can identify potential configuration errors, security vulnerabilities and optimization opportunities before deployment. In some embodiments, the framework can create and maintain a knowledge base of common configuration patterns and their associated outcomes, allowing predicted and/or suggested corrections and improvements based on learned patterns from successful deployments, as discussed herein.

In some embodiments, debugging capabilities can be enhanced through the implementation of anomaly detection models that operate on network telemetry data collected during testing. Such models can establish baseline behavior patterns for different device types and configurations, enabling the early identification of potential issues that might not be apparent through static analysis alone. In some embodiments, the framework can employ both supervised and unsupervised learning techniques to identify unusual behavior patterns, with supervised models focused on known issue patterns and unsupervised models capable of identifying novel anomalies that might indicate previously unknown problems.

In some embodiments, the debugging capabilities during operations (e.g., during run-time, as discussed below) can be enhanced through the implementation of root cause analysis models that can quickly identify the source of network issues. Such models can employ causal inference techniques to analyze the relationship between observed symptoms and potential underlying causes, allowing for rapid problem identification and resolution. Thus, the framework can create and maintain a database of problem-resolution pairs that grows over time, thereby improving the framework's ability to diagnose and resolve similar issues in the future.

In some embodiments, configuration management during the testing phase can leverage reinforcement learning models that have been trained on successful network deployments. Such models learn optimal configuration patterns by analyzing the relationship between configuration changes and resulting network performance metrics. In some embodiments, the framework can implement a safe exploration strategy that allows for testing of configuration variations within controlled bounds, gradually expanding the space of tested configurations as confidence in the model's predictions increases. Such approach enables the discovery of optimal configurations while minimizing the risk of catastrophic failures during testing.

In some embodiments, the disclosed framework can implement simulation capabilities to test configurations under various network conditions before deployment. Such simulations, for example, use generative models trained on real network traffic patterns to create realistic test scenarios that challenge both the device configurations and the AI models themselves. In some embodiments, the framework can generate edge cases and stress test scenarios that can be difficult or impossible to create in physical test environments, providing a more comprehensive validation of device configurations and operational parameters.

According to some embodiments, during real-world operations, the disclosed framework can transition to a more conservative operational mode that prioritizes stability, while maintaining the ability to adapt to changing conditions. In some embodiments, the framework can implement a hierarchical decision-making structure where routine adjustments are handled by well-validated models operating within strict bounds, while more significant changes require higher levels of confidence and potentially human oversight. Such approach balances the need for automated management with the requirement for operational stability.

In some embodiments, the operational phase employs real-time monitoring and analysis capabilities powered by deep learning models that have been specifically trained to identify patterns indicative of developing issues. Such models can process multiple data streams simultaneously, including network telemetry, system logs and performance metrics, to maintain a comprehensive view of network health. In some embodiments, the framework can utilize attention mechanisms to focus on the most relevant indicators for different types of issues, thereby allowing for efficient processing of large volumes of operational data.

In some embodiments, the disclosed framework can implement rollback capabilities that can quickly revert problematic changes while maintaining network stability. Such capabilities can be powered by AI/ML models that predict the impact of configuration changes before they are applied, allowing the framework to prepare appropriate rollback procedures in advance. The framework can create and maintain a state history that enables precise tracking of configuration changes and their effects, thereby facilitating rapid problem resolution when issues arise.

Accordingly, as discussed herein, in some embodiments, during both testing and operational phases, the disclosed systems and methods can create and maintain separate/distinctive AI/ML models for different aspects of network operation, thereby allowing for specialized optimization of each component, while maintaining coordination through a higher-level orchestration layer. Such modular approach enables more efficient training and validation of individual components while maintaining effective overall system operation.

The disclosed comprehensive approach to network management enables effective operation across both testing and operational phases, while maintaining necessary safeguards and fallback mechanisms. The framework's ability to learn from operational experience while maintaining stable operation makes the framework an effective tool for managing modern network infrastructure, while its sophisticated validation and security mechanisms ensure reliable operation in real-world environments. Indeed, through careful integration of multiple known or to be known AI/ML technologies and network management approaches, the framework provides robust capabilities for debugging, configuration and operation of network devices while maintaining the flexibility to adapt to changing network requirements and conditions. The combination of testing phase validation and operational phase adaptation ensures that network devices can be effectively managed while minimizing the risk of disruption to network operations According to some embodiments, Step 502 of Process 500 can be performed by identification module 202 of network engine 200; Step 504 can be performed by analysis module 204; Step 506 can be performed by determination module 206; and Steps 508-514 can be performed by control module 208.

In some embodiments, Process 500 begins with Step 502 where engine 200 can identify a request related to an application and a device(s). According to some embodiments, for the purposes of this discussion, a single device will be discussed as part of the processing of Process 500; however, one of ordinary skill in the should recognize that additional devices can be subject to the processing discussed herein (e.g., either simultaneously being processed, or processed in an overlapping or iterative manner) without departing from the scope of the instant disclosure.

In some embodiments, such request, as discussed above, can be tied to configuring a device prior to its launch—for example, testing a device for a specific type of application(s) and/or network configuration, and determining how it operates with such configurations, so that modifications to its configurations can be performed, as discussed infra.

In some embodiments, such request, as also discussed above, can be tied to a device performing operations on a network, where real-time configuration modifications and controls can be applied to the device in the runtime environment to maintain its connectivity to the network a threshold levels to ensure a threshold satisfying QoE and QoS.

According to some embodiments, the request can include information related to, but not limited to, a user, ID, account information, device ID, device type, application information (e.g., type, version, provider, and the like), content data/metadata, network information (e.g., network service set ID (SSID), channel/band, and the like), IP address, MAC address, and the like, or some combination thereof. Such information can further include, but is not limited to, time, location, position within a location, and the like.

Accordingly, in some embodiments, the request can provide information related to requested and/or required configurations for the device to operate on a network. For example, the device/UE is a STB device, and it is being configured to support pairing and communication with a smart phone type/version (e.g., iPhone®, for example) so that content viewing experiences can be curated and provided to the user via certain ports (e.g., Tx, Rx, for example) of the STB as it connects to another UE (e.g., television). In another non-limiting example, the device can be an AP device, for which its network hosting configuration is being tested and configured prior to its launch. And, in yet another non-limiting example, the device can be an AP device that is actively providing capabilities to a network location, and its configuration needs to be modified to support newly connecting devices and/or upgraded ISP plans by the customers.

Thus, in some embodiments, the request can be provided by a user and/or device, and in some embodiments, the request can be triggered based on a detected network event that, in a runtime environment, require further configuration and modification of a device's capabilities to handle the modified network characteristics.

In Step 504, engine 200 can analyze the request, which can include analyzing the information referenced in the request, as discussed above. According to some embodiments, such analysis can involve parsing the request and extracting information related to the data/metadata required for executing the request (e.g., network ID, application ID, user ID, account information, and the like).

According to some embodiments, such analysis can be performed via any of the known or to be known AI/ML and/or LLM techniques discussed above, where the information referenced in the request can be provided as input to such model(s).

In Step 506, based on the analysis in Step 506, engine 200 can determine operational parameters for the device, which in some embodiments, can be tied to an associated network. For example, for testing environments, certain network configurations can be determined as the parameters to enable the device to operate within a particular network. In another example, for runtime environments, the parameters can be tied to required modifications to the network and/or device functionality (e.g., which ports are open, which applications are executing, and the like) to enable the network connectivity to continue without interruption in light of the request.

Accordingly, such operational parameters, as discussed above, can correspond to instructions for, but not limited to, ports, antennas (Tx, Rx), interfaces (e.g., network interface card (NIC), and the like), VLAN configurations, routing protocols, network address translations, security modes, encryption types, channel selection, transmission power, authentication methods, firewall, virtual private network (VPN) configurations, traffic prioritization, QoS settings, load balancing configurations, firmware/software version management, simple network management protocol (SNMP) settings, IP addressing, port settings, and the like.

In some embodiments, such operational parameters can be stored in database 108, as discussed above.

In Step 508, engine 200 can operate to retrieve a trained model for performance of the operational parameters. Such retrieved model can be identified via a search for a specifically trained model that can operate to configure the device/network according to the determined operational parameters from Step 506. In some embodiments, as discussed above, such AI/ML model can be trained via a training dataset that includes information related to the operational parameters determined above, such that such model is capable of handling not only the application of such parameters, but also the device type and version for which such parameters are to be applied. Therefore, the trained model can be trained on data related to, but not limited to, the operational parameters, device information, network information, and the like, or some combination thereof, such that the model can be applied to the testing and/or runtime environment and function to configure the device, as discussed herein.

In Step 510, engine 200 can execute a response to the request via the retrieved model. That is, as discussed above, the request includes a specific configuration request and/or modification to a device's capabilities and/or network characteristics, and via execution of the trained model, with the operational parameters (and, in some embodiments, the request information) as an input(s), engine 200 can execute such response.

Thus, via the execution in Step 510, engine 200 can perform a device, network and/or application modification in line with the request from Step 502, as discussed above, which can involve modification to the functionality and/or configuration of the device, network and/or application.

In Step 512, engine 200 can perform steps to update the model based on the execution in Step 510. That is, engine 200 can operate to further train the model retrieved in Step 508 and applied in Step 510, whereby the further training can be based on, but not limited to, the operational parameters, request information, device information, network information, application information, runtime environment, testing environment, and the like, or some combination thereof.

And, in Step 514, engine 200 can function to perform verification of the execution in line with the request. That is, engine 200 can perform an audit operation to ensure that the requested modification/configuration from the request is i) performed on the device/network/application and ii) such modifications achieve the result on the device/network/application. For example, verifying that the port modifications on the device enable additional connections; confirming that the increased bandwidth enabled the device to connect to a specific network resource, and the like. Accordingly, in some embodiments, engine 200 can leverage the model and/or any other AI/ML or LLM model to analyze the current (now modified) performance of the device/network/application to determine whether the request is satisfied via the applied operational parameters.

Figure 8:
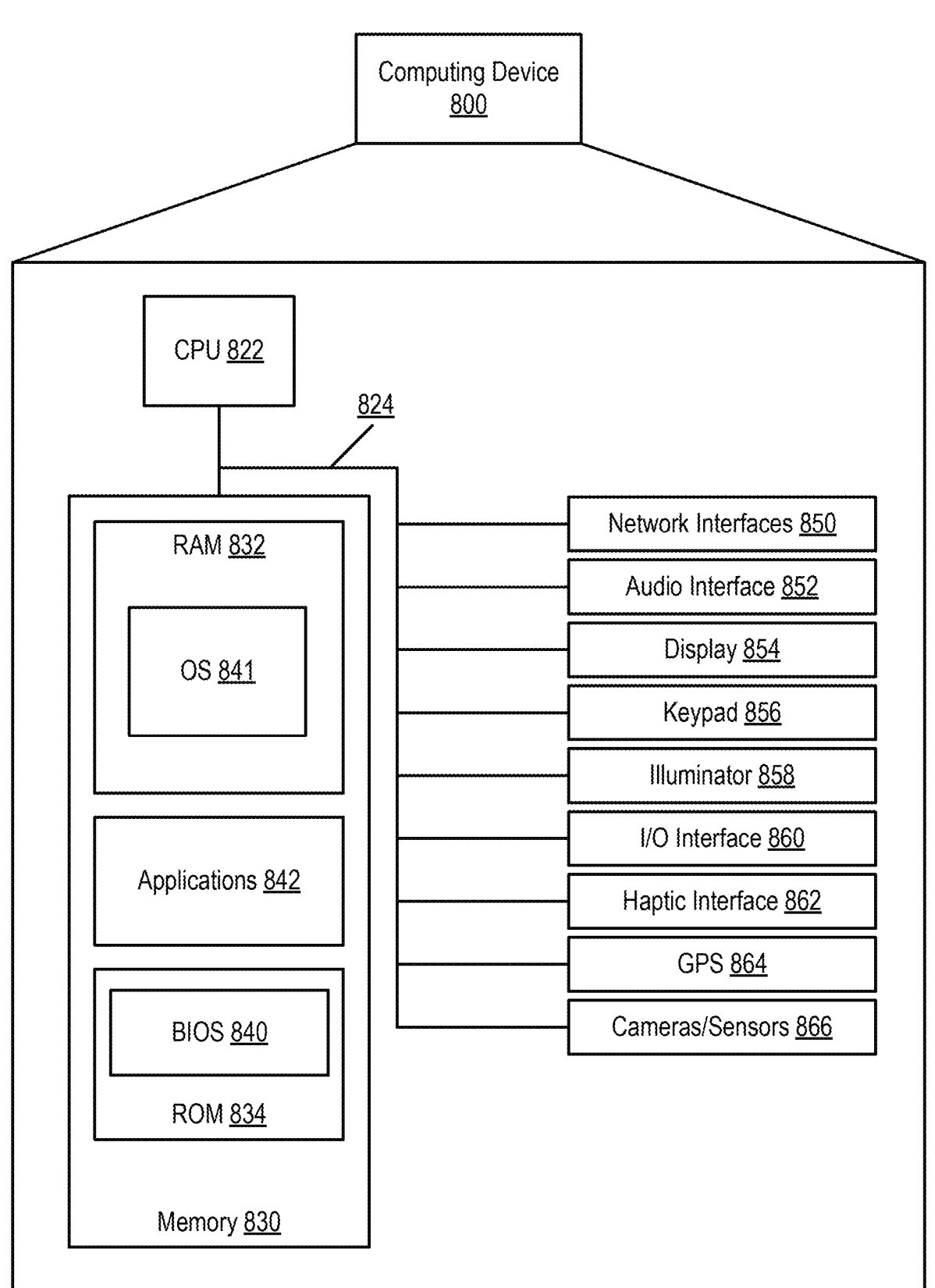
FIG. 8 is a block diagram illustrating a computing device showing an example of a client or server device used in various embodiments of the present disclosure.

FIG. 8 is a schematic diagram illustrating a client device showing an example embodiment of a client device that may be used within the present disclosure. Client device 800 may include many more or less components than those shown in FIG. 8. However, the components shown are sufficient to disclose an illustrative embodiment for implementing the present disclosure. Client device 800 may represent, for example, UE 102 discussed above at least in relation to FIG. 1.

As shown in the figure, in some embodiments, Client device 800 includes a processing unit (CPU) 822 in communication with a mass memory 830 via a bus 824. Client device 800 also includes a power supply 826, one or more network interfaces 850, an audio interface 852, a display 854, a keypad 856, an illuminator 858, an input/output interface 860, a haptic interface 862, an optional global positioning systems (GPS) receiver 864 and a camera(s) or other optical, thermal or electromagnetic sensors 866. Device 800 can include one camera/sensor 866, or a plurality of cameras/sensors 866, as understood by those of skill in the art. Power supply 826 provides power to Client device 800.

Client device 800 may optionally communicate with a base station (not shown), or directly with another computing device. In some embodiments, network interface 850 is sometimes known as a transceiver, transceiving device, or network interface card (NIC).

Audio interface 852 is arranged to produce and receive audio signals such as the sound of a human voice in some embodiments. Display 854 may be a liquid crystal display (LCD), gas plasma, light emitting diode (LED), or any other type of display used with a computing device. Display 854 may also include a touch sensitive screen arranged to receive input from an object such as a stylus or a digit from a human hand.

Keypad 856 may include any input device arranged to receive input from a user. Illuminator 858 may provide a status indication and/or provide light.

Client device 800 also includes input/output interface 860 for communicating with external. Input/output interface 860 can utilize one or more communication technologies, such as USB, infrared, Bluetooth™, or the like in some embodiments. Haptic interface 862 is arranged to provide tactile feedback to a user of the client device.

Optional GPS transceiver 864 can determine the physical coordinates of Client device 800 on the surface of the Earth, which typically outputs a location as latitude and longitude values. GPS transceiver 864 can also employ other geopositioning mechanisms, including, but not limited to, triangulation, assisted GPS (AGPS), E-OTD, CI, SAI, ETA, BSS or the like, to further determine the physical location of client device 800 on the surface of the Earth. In one embodiment, however, Client device 800 may through other components, provide other information that may be employed to determine a physical location of the device, including for example, a MAC address, Internet Protocol (IP) address, or the like.

Mass memory 830 includes a RAM 832, a ROM 834, and other storage means. Mass memory 830 illustrates another example of computer storage media for storage of information such as computer readable instructions, data structures, program modules or other data. Mass memory 830 stores a basic input/output system ("BIOS") 840 for controlling low-level operation of Client device 800. The mass memory also stores an operating system 841 for controlling the operation of Client device 800.

Memory 830 further includes one or more data stores, which can be utilized by Client device 800 to store, among other things, applications 842 and/or other information or data. For example, data stores may be employed to store information that describes various capabilities of Client device 800. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 800.

Applications 842 may include computer executable instructions which, when executed by Client device 800, transmit, receive, and/or otherwise process audio, video, images, and enable telecommunication with a server and/or another user of another client device. Applications 842 may further include a client that is configured to send, to receive, and/or to otherwise process gaming, goods/services and/or other forms of data, messages and content hosted and provided by the platform associated with engine 200 and its affiliates.

According to some embodiments, certain aspects of the instant disclosure can be embodied via functionality discussed herein, as disclosed supra. According to some embodiments, some non-limiting aspects can include, but are not limited to the below method aspects, which can additionally be embodied as system, apparatus and/or device functionality:

Aspect 1. A method comprising steps of:
monitoring, by a device, network activity for a network at a location;
detecting, by the device, based on the monitoring of the network activity, an issue, the issue corresponding to a disruption of the network;
determining, by the device, based on information related to the issue, operational instructions for mitigating the issue; and
executing, by the device, the operational instructions, the execution causing modifications operations of the network at the location for a connected device related to the issue.
Aspect 2. The method of aspect 1, further comprising:
communicating, by the device, over the network, the operational instructions to a cloud; and
causing, based on the communication, storage of the operational instructions in a location associated with the cloud.
Aspect 3. The method of aspect 2, further comprising filtering information sent to the cloud to correspond to the operational parameters and the issue information.
Aspect 4 The method of aspect 2, wherein the cloud is capable of communicating the operational instructions to another device at another location upon the issue arising on a network at the other location.
Aspect 5. The method of aspect 4, further comprising the communication to the other device occurring when other network and the network have similar characteristics.
Aspect 6. The method of aspect 1, further comprising:
analyzing, via an artificial intelligence or machine learning (AI/ML) model, the issue information; and
performing the determination of the operational parameters based on the AI/ML model analysis.
Aspect 7. The method of aspect 1, further comprising the operational instructions being retrieved from a local storage associated with the device.
Aspect 8. The method of aspect 1, further comprising the operational instructions being previously provided from a cloud based on another device determining the operational instructions at another location.
Aspect 9. The method of aspect 1, further comprising the device executing an application to perform the steps.
Aspect 10. The method of aspect 1, further comprising the network being a WiFi network for the location.
Aspect 11. The method of aspect 1, further comprising synchronizing information related to the mitigation of the issue with information related to delivery of content to the network, wherein the operational instructions are based on the synchronization.

Aspect 12. A method comprising:
monitoring, over a network, network activity of a device, the device connected to the network, the network being a WiFi network associated with a location, the network activity corresponding to a specific activity being requested by a user;
analyzing the network activity, and determining, based on the analysis, a classification for the network activity;
determining, based on the classification, a set of parameters for the network activity, the set of parameters comprising controls for how the device can function the specific activity on the network; and
controlling, over the network, the device based on the set of parameters.
Aspect 13. The method of aspect 12, further comprising determining network management operations for the network activity, the network management operations being controls capable of being applied at one of a device level, at the network level or location-level.
Aspect 14. The method of aspect 13, further comprising implementing the network management operations, such that the control of the device is further based on the implementation of the network management operations.
Aspect 15. The method of aspect 12, further comprising:
retrieving, based on information related to the device, network behavior information for the device, the network behavior information corresponding to past habits as related to the specific activity; and
performing the analysis of the network activity based further on the network behavior information.
Aspect 16. A method comprising:
identifying a request related to a device, the request corresponding to configuration of a device related to connectivity of the device to a network;
determining, based on the request, operational parameters for the device, the operational parameters configured to modify the configuration of the device;
retrieving a computer model trained to perform the operational parameters in response to the request;
executing the computer model with the operational parameters as an input; and
modifying the configuration of the device based on the execution of the computer model, the modified configuration corresponding to the request.
Aspect 17. The method of aspect 16, further comprising:
verifying, based on information within the request, that the modified configuration complies with the configuration identified in the request.
Aspect 18. The method of aspect 16, further comprising the request corresponding to an application executed in relation to the device, such that the modified configuration impacts how the application executes on the device.
Aspect 19. The method of aspect 16, further comprising the request corresponding to a testing environment of the device.
Aspect 20. The method of aspect 16, further comprising the request corresponding to a runtime environment of the device.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising steps of:
monitoring, by an access point device, network activity for a network at a location;
detecting, by the access point device, based on the monitoring of the network activity, an issue currently occurring on the network, the issue comprising a disruption related to connectivity of a device to the network, the disruption comprising network characteristics that reduce a service of the network below a threshold;
determining, by the access point device, based on information related to the issue, operational instructions for mitigating the issue, the operational instructions comprising modifications, without user input, to at least one of a network channel, a network component or at least one network parameter; and executing, by the access point device, the operational instructions, the execution causing the modifications to at least one of the network channel, the network component or at least one network parameter to be performed such that the network characteristics are adjusted to levels causing the service of the network to satisfy the threshold, the modifications thereby causing restoration of the service and the connectivity of the device to the network.

2. The method of claim 1, further comprising:

communicating, by the access point device, over the network, the operational instructions to a cloud; and causing, based on the communication, storage of the operational instructions in a location associated with the cloud.

3. The method of claim 2, further comprising filtering information sent to the cloud to correspond to the operational instructions and the issue information.

4. The method of claim 2, wherein the cloud is capable of communicating the operational instructions to another device at another location upon the issue arising on a network at the other location.

5. The method of claim 4, further comprising the communication to the other device occurring when other network and the network have similar characteristics.

6. The method of claim 1, further comprising another node on a network at another location receiving the operational instructions, such that predictive mitigation of the issue on the other network is performed based on execution of the operational instructions prior to the issue occurring at the other node.

7. The method of claim 1, further comprising:

analyzing, via an artificial intelligence or machine learning (AI/ML) model, the issue information; and performing the determination of the instructions based on the AI/ML model analysis.

8. The method of claim 1, further comprising the operational instructions being retrieved from a local storage associated with the device.

9. The method of claim 1, further comprising the operational instructions being previously provided from a cloud based on another device determining the operational instructions at another location.

10. The method of claim 1, further comprising the network being a WiFi network for the location.

11. The method of claim 1, further comprising synchronizing information related to the mitigation of the issue with information related to delivery of content to the network, wherein the operational instructions are based on the synchronization.

12. An access point device comprising:

a processor:

monitor network activity for a network at a location;

detect, based on the monitoring of the network activity, an issue currently occurring on the network, the issue comprising a disruption related to connectivity of a device to the network, the disruption comprising network characteristics that reduce a service of the network below a threshold;

determine, based on information related to the issue, operational instructions for mitigating the issue, the operational instructions comprising modifications, without user input, to at least one of a network channel, a network component or at least one network parameter; and execute the operational instructions, the execution causing the modifications to at least one of the network channel, the network component or at least one network parameter to be performed such that the network characteristics are adjusted to levels causing the service of the network to satisfy the threshold, the modifications thereby causing restoration of the service and the connectivity of the device to the network.

13. The access point device of claim 12, wherein the processor is further configured to:

communicate, over the network, the operational instructions to a cloud; and cause, based on the communication, storage of the operational instructions in a location associated with the cloud.

14. The access point device of claim 13, wherein the processor is further configured to filter information sent to the cloud to correspond to the instructions and the issue information.

15. The access point device of claim 13, wherein the cloud is capable of communicating the operational instructions to another device at another location upon the issue arising on a network at the other location.

16. The access point device of claim 15, wherein the processor is further configured such that the communication to the other device occurs when other network and the network have similar characteristics.

17. The access point device of claim 12, further comprising another node on a network at another location receiving the operational instructions, such that predictive mitigation of the issue on the other network is performed based on execution of the operational instructions prior to the issue occurring at the other node.

18. The access point device of claim 12, wherein the processor is further configured such that the operational instructions are previously provided from a cloud based on another device determining the operational instructions at another location.

19. The access point device of claim 12, wherein the processor is further configured to synchronize information related to the mitigation of the issue with information related to delivery of content to the network, wherein the operational instructions are based on the synchronization.

20. A non-transitory computer-readable storage medium tangibly encoded with computer-executable instructions, that when executed by an access point device, perform a method comprising:

monitoring, by the access point device, network activity for a network at a location;

detecting, by the access point device, based on the monitoring of the network activity, an issue currently occurring on the network, the issue comprising a disruption related to connectivity of a device to the network, the disruption comprising network characteristics that reduce a service of the network below a threshold;

determining, by the access point device, based on information related to the issue, operational instructions for mitigating the issue, the operational instructions comprising modifications, without user input, to at least one of a network channel, a network component or at least one network parameter; and executing, by the access point device, the operational instructions, the execution causing the modifications to at least one of the network channel, the network component or at least one network parameter to be performed such that the network characteristics are adjusted to levels causing the service of the network to satisfy the threshold, the modifications thereby causing restoration of the service and the connectivity of the device to the network.

* * * * *